L. BRUCKMANN.
APPARATUS FOR AUTOMATICALLY MAKING SOLDERED CORD OR TWISTED CHAIN.
APPLICATION FILED JAN. 29, 1908.
965,071.
Patented July 19, 1910.
5 SHEETS—SHEET 1.
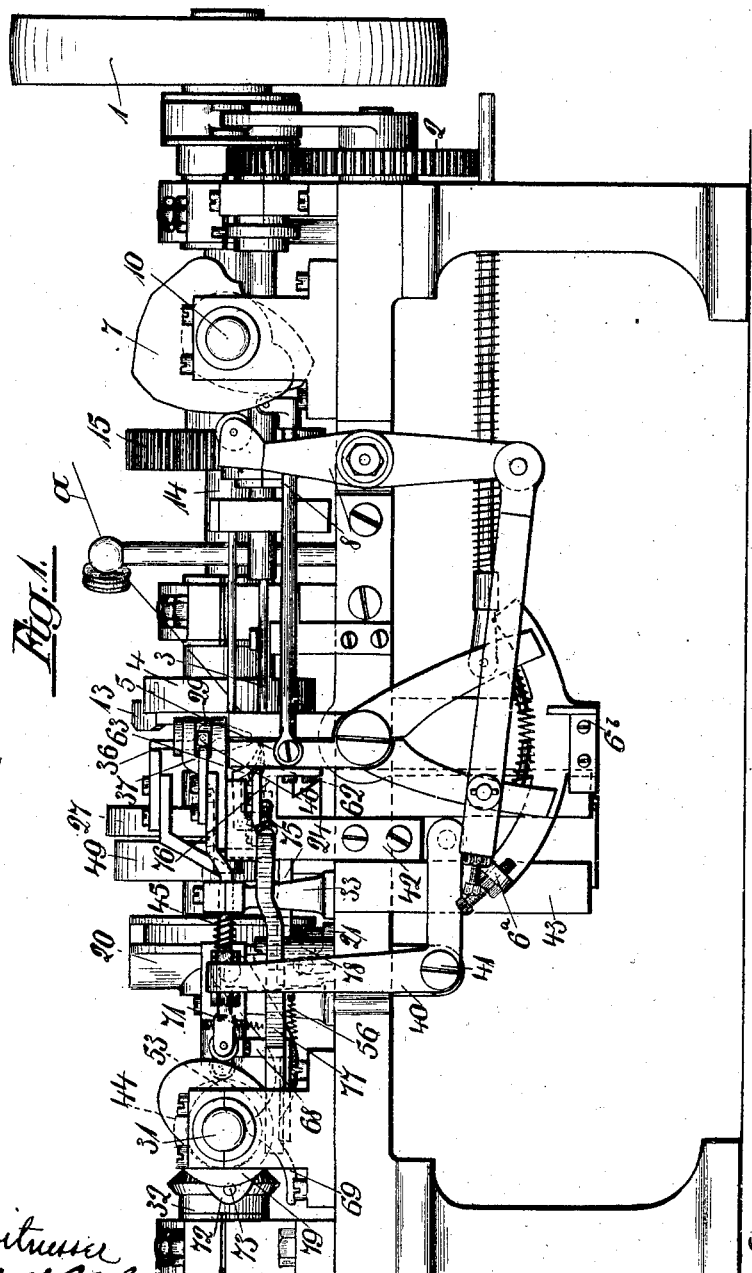

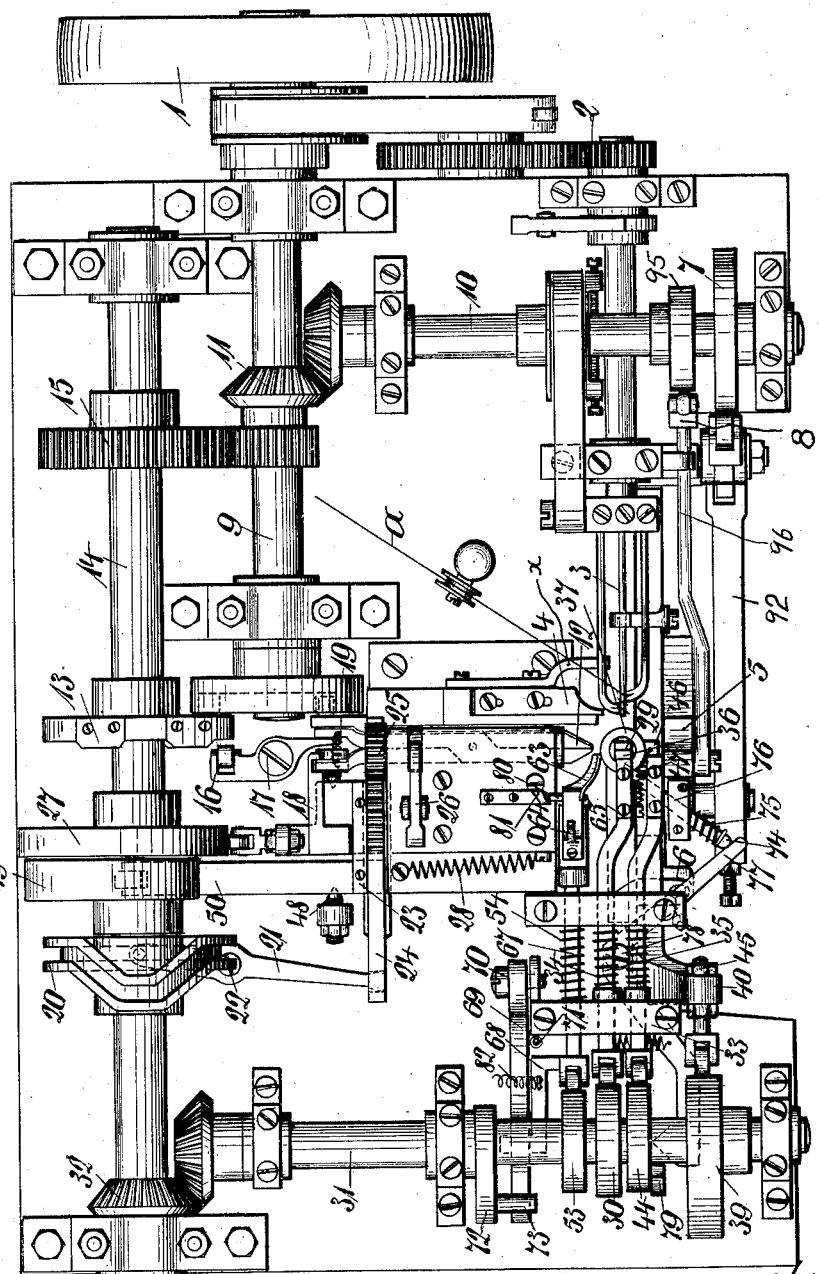

L. BRUCKMANN.
APPARATUS FOR AUTOMATICALLY MAKING SOLDERED CORD OR TWISTED CHAIN.
APPLICATION FILED JAN. 29, 1908.
965,071.
Patented July 19, 1910.
5 SHEETS—SHEET 3.
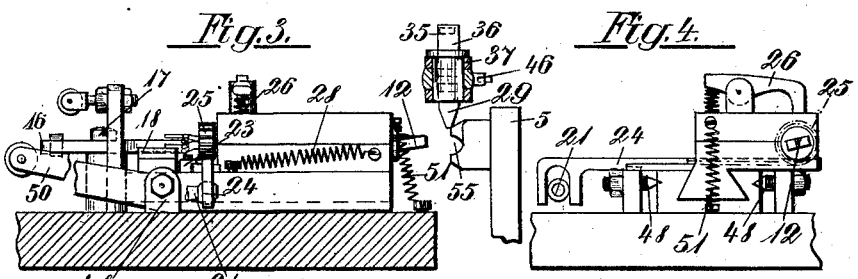
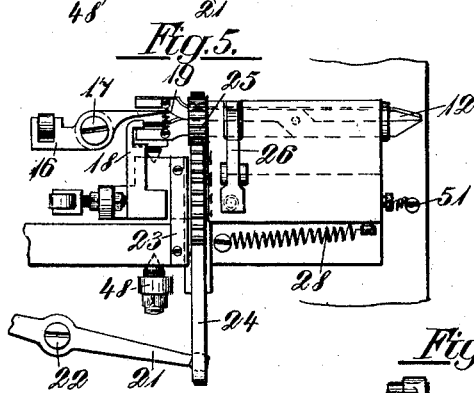
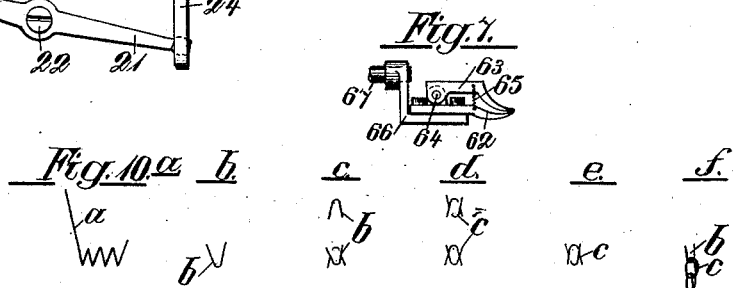
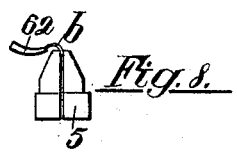

L. BRUCKMANN.
APPARATUS FOR AUTOMATICALLY MAKING SOLDERED CORD OR TWISTED CHAIN.
APPLICATION FILED JAN. 29, 1908.
965,071.
Patented July 19, 1910.
5 SHEETS—SHEET 4.
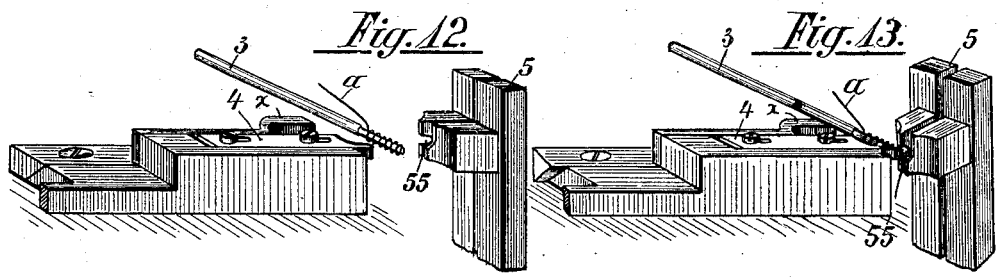
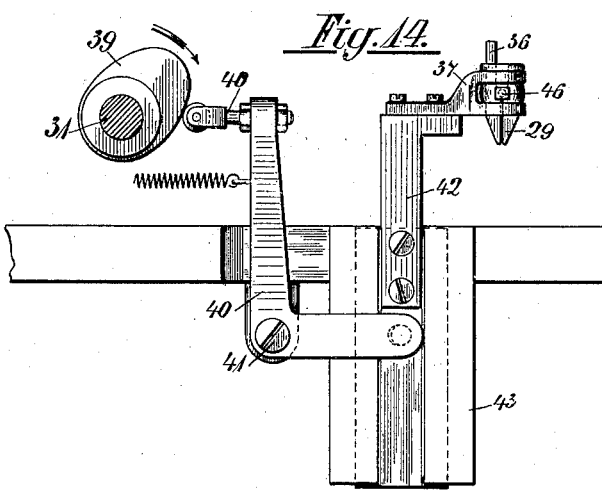
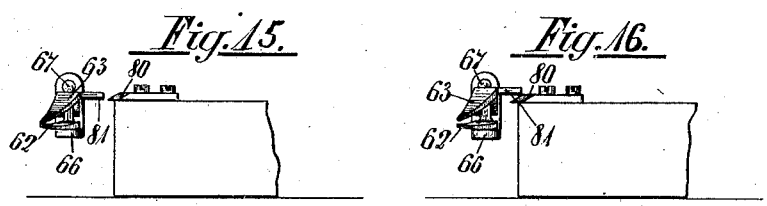
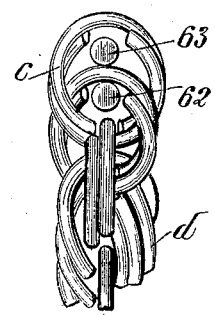

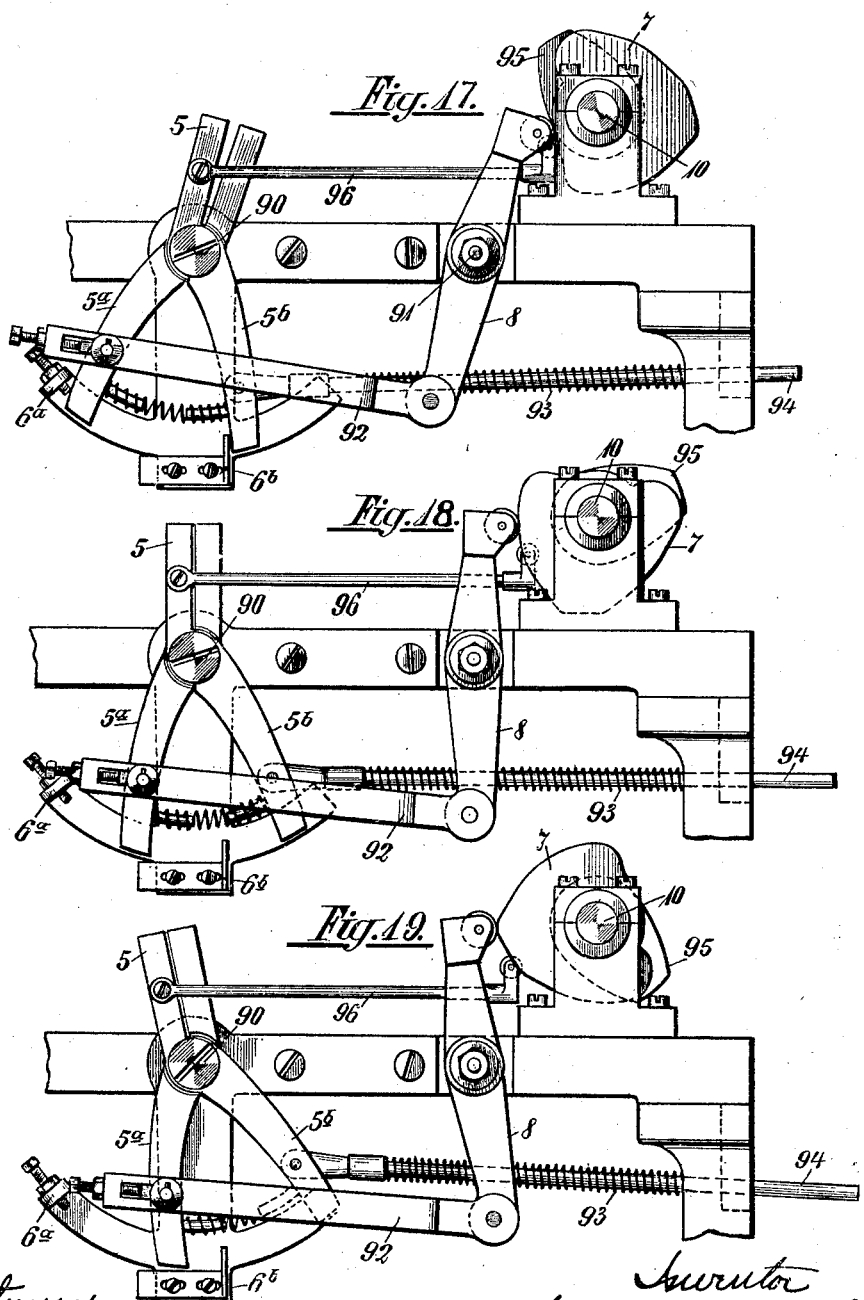

UNITED STATES PATENT OFFICE.

LUDWIG BRUCKMANN, OF PFORZHEIM, GERMANY.

APPARATUS FOR AUTOMATICALLY MAKING SOLDERED CORD OR TWISTED CHAIN.

965,071.  Specification of Letters Patent.  Patented July 19, 1910.

Application filed January 29, 1908. Serial No. 413,171.

*To all whom it may concern:*

Be it known that I, LUDWIG BRUCKMANN, a citizen of the German Empire, residing at Pforzheim, in the Grand Dukedom of Baden, Empire of Germany, have invented certain new and useful Improvements in Apparatus for Automatically Making Soldered Cord or Twisted Chain; and I do hereby declare the following to be a full, clear, and exact description of the invention, such as will enable others skilled in the art to which it appertains to make and use the same.

This invention relates to an improved apparatus for automatically making soldered cord or twisted chains. Such chains have the appearance of a cord or rope and consist of separate links formed of wire coils or rings soldered together. These wire coils or rings are pushed with their open ends, that is to say are intertwined or crossed one over the other, so that the closely succeeding links, which are doubly suspended one in another, are always more mutually twisted and the chain has the appearance of a cord or rope. Such chains have hitherto always been made by hand with the exception of the machine made chains known under the name of "Parisian cord chains", which are however not soldered and have very little strength against breakage, and the manufacture of such soldered chains is a very difficult operation which only admits of a small production. By the present invention these chains may be made mechanically, whereby not only uniformly neat result, but in particular a large output can be attained.

In the machine according to this invention the wire is wound off the reel and, in known manner, first automatically wound in helical coils of which the first coil is gripped by pincers, cut off, and brought to the operating place. The manufacture of the chain itself, that is to say the inter-insertion of the links in such a way that they give the appearance of a cord, is substantially operated by pincers or pliers, which grip the links, turn them to the required extent, hang them one in another and so-forth. All these operations take place quite automatically, so that the wire from the reel is mechanically converted into a finished chain.

A machine for carrying out the improved process in accordance with this invention, is shown in one form of construction, as an example, in the accompanying drawing, in which:—

Figure 1 is a front view of the whole machine; Fig. 2, a plan view; Figs. 3, 4 and 5, a side view, a front view and a plan view respectively showing the combined action of the pincers or pliers; Figs. 6 and 7, enlarged detail views of the pincers or pliers; Fig. 8, a detailed plan view showing the position of the pincers during the hooking together of the chain links; while Fig. 9 shows the retention of the chain by the new pincers or pliers and illustrates also the chain produced in detail. Figs. $10^a$, $10^b$, $10^c$, $10^d$, $10^e$, $10^f$ explain progressively the conversion of the wire into the finished chain, which is shown in outline in Fig. 9. Fig. 11 shows detailed views of a chain link. Figs. 12 and 13 are views illustrating a mandrel upon which the wire is coiled and cutting mechanism for severing the links and the first pair of pincers whereby the links are grasped. Fig. 14 is a view illustrating vertically movable and rotary pincers whereby the links are grasped. Figs. 15 and 16 are views illustrating the pincers which grasp and hold the chain while a new link is being formed, and, Figs. 17, 18 and 19 are views showing the pincers which receive the links immediately after they are severed from the coil and illustrating the operating mechanism therefor.

The wire $a$ to be treated is first in known manner wound in helical coils (Fig. $10^a$) by means of a die or mandrel 3 turned periodically by the intermediary of cog-wheels 2 from the driving pulley 1 of the machine, the separate coils $b$ corresponding to the links $c$ of a chain. The foremost coil or helix $b$ is now gripped by a pincers or pliers 5 and cut off by a cutting device 4, which is also of known type, and conveyed to the place where it is to be treated.

The pincers 5 consist of the two parts $5^a$ and $5^b$ revoluble on a bolt 90. For operating the pincers a shaft 10 is provided having the cam 7 engaging the lever 8 revoluble on the bolt 91 and connected by an adjusting link 92 with the part $5^a$ of the pincers 5. Against the part $5^a$ the other part $5^b$ is pressed by a spring 93, guided on a rod 94, whereby the two parts $5^a$ and $5^b$ of the pincers 5 are pressed one against the other. These pincers 5 must be opened for taking and giving free the coils 5 or the chain members $c$. For taking the coil $b$ which shall be cut off, the stops $6^a$ and $6^b$ are provided, against which the parts $5^a$ and $5^b$ bear. Hereby the part $5^b$ bears at the stop $6^b$, Fig. 17, while the other part $5^a$ moves farther only a little, whereby the pincers 5 are opened and can then take the coil $b$. For giving free the chain member $c$, the pincers 5 must be opened again. This is attained by a second cam 95 provided on the shaft 10, which engages the rod 96 connected loosely on the part $5^b$. This rests now by means of the rod 96 against the cam 95 at that part, which has the form of a circle, so that the part $5^b$ cannot more follow to the part $5^a$, whereby the pincers 5 are opened again a little as shown in Fig. 19. One of the two cutting jaws of the pliers 5 is provided with a recess 55, Figs. 3, 12 and 13, in addition to a semi-circular transverse recess which passes through both jaws of the pliers. The recess 55 enables one side of the half of the cut off coil contained in the pincers to be exposed more than the other and serves for giving space for the pliers 29 in their descent, so that they can engage the gripped coil. In the present form of construction the opening and closing of the pincers 5 is effected by means of contacts 6 the arms of the pincers being operated by means of eccentric rods 8 and cams 7, the shaft 10 of which is connected by means of bevel wheels 11 with the shaft 9 of the driving pulley 1.

The winding mandrel 3 is flexible to a degree such that it may be pushed toward the plane in which the pincers 5 oscillate, and an arm $x$ is secured to the side which carries the cutting device 4 and moves therewith, which arm engages the mandrel and pushes it to one side so as to bring the end of the coil between the jaws of the pincers 5 when they are opened as shown in Fig. 17. During this movement the end convolution of the coil is severed by the cutter 4 and the pincers 5 close and hold the severed link. The cutting device then recedes and the pincers 12 are moved forward and opened so as to grasp the link held by the pincers 5, whereupon the pincers 5 are opened and the severed coil left with the pincers 12.

When the coil $b$ (Fig. $10^b$) has been brought to the operating place, it is seized by pincers 12, arranged opposite to the pincers 5, turned through 180° and then carried upward by pincers or pliers 29. In the meantime a fresh coil has been fetched by the pliers 5 and this coil is not turned but the pincers 29 with their coil now descends and pushes it over the other coil, which in the meantime is held ready (Figs. $10^c$ and 11). The lower coil $b$ is engaged with the last link but one of the chain already made, which is hung or suspended by means of pliers 62, 63, just before the upper coil, which has been turned through 180°, is brought into engagement with such lower coil and closed. It is then soldered, the finished chain being lifted with it.

For opening the second pincers 12 in order to grip the chain link already held by the pincers 5, a cam disk 13 is provided which is mounted on a shaft 14 which is connected by means of cog-wheels 15 with the driving shaft, in such a way that the shaft 14 makes only half as many revolutions as the shaft 9. This cam disk 13 acts on the free end of a lever 16 which turns on a pin 17, and the other end of which lever engages between the rear ends of the arms or shanks of the second pincers 12. One of these arms is held fast in an abutment or support 18, while the other is operated by the lever 16. On the cam disk 13 being operated it opens in known manner the second pincers 12 against the action of a sprig 19. A cam disk 27 which is also mounted on the shaft 14 serves for pushing forward the second pincers 12, and displacing the carriage 23 in which a rack bar 24 and the second pincers 12 are mounted, while the return movement of the same is operated by a spring 28. Now when the second pincers 12 has gripped the cut off coil $b$, it is turned through 180°. This movement is effected by a cam disk 20 mounted on the shaft 14, in the groove of which disk a lever 21 engages which is pivotal on a pin 22 and the free end of which pushes the rack bar 24 carried in the carriage 23 to and fro. A pinion 25 is in engagement with this rack bar, which pinion is mounted on the longitudinal axis of the second pincers 12, and thus when suitably displaced turns these second pincers also through 180°, the second pincers 12 being retained in their position after each turning by means of a stopping device 26. The coil $b$ now turned, is gripped by a third pincers 29. This is located over the place of treatment and moves vertically. This third pincers 29 is opened by means of a cam 30 which is mounted on a shaft 31, which is connected by means of bevel wheels 32 with the shaft 14. This cam 30 displaces a rod 35 sliding in guides 33 and acted on by a spring 34, which rod encounters the projection 36 of one of the arms of the third pincers 29 (Fig. 6). The other arm of the pincers finds an abutment in its bearing 37, so that by the rod 35 encountering it the pincers is opened. The arm 36 and its pincer shank are acted on by a spring 38 (Fig. 6), which operates the closing of the pincers 29. The coil $b$ engaged by the pincers is now raised by the pincers 29 upward (Fig. $10^c$) in order to come away from the place of treatment. This lifting is produced by means of a cam 39 which is also mounted on the shaft 31 and displaces by means of an elbow lever 40, which pivots on a bolt 41, a vertical carriage 42, which slides in guides 43. The bearing 37 of the third pincers 29 is arranged on this carriage 42. On the rotation of the cam 39 the elbow lever is thus caused to rock, which in turn lowers the carriage 42 and the pincers 29, while they are raised by means of a spring 56. During this time the second pincers 12 has been turned back to its initial position through 180°, and thus the first pincers 5 has taken up another coil $b$ and brought it to the place of treatment (Fig. 10$^d$). Now before this coil or link $b$ is gripped by the pincers 12, the pincers 29 again descends and executes simultaneously such a turning movement that the two links of the chain $b$ rest on one another crossed or intertwined in the reverse direction (Fig. 11). This turning of the pincers 29 is effected by a third cam disk 44 mounted on the shaft 31, which causes a second rod 45 sliding in the guides 33 to be displaced. The rod 45 then strikes on an arm 46 of the pincers 29 and thereby causes this pincers to turn a short distance on its longitudinal axis, while the return movement of the same is effected by a spring 47.

The two coils $b$ now lie on one another in the necessary way for making a cord or twisted chain. These two links $b$ must now be soldered together to one link $c$. For this object the pincers 12 engages the two links in the manner described simultaneously and holds them firmly on one another. These two links are then raised and in the raised position soldered in any suitable or known manner, for instance by electrical means or by a jet flame or the like, after they have been first touched with soldering water and solder. In order to lift the links $b$ of the chain, the carriage 23 is pivotal on points 48 and is operated by a cam disk 49 mounted on the shaft 14, which operates a projecting arm 50 of the carriage 23, the return of the carriage being effected by means of a spring 51. After the soldering the pincers 12 again descends and, in order to remove the finished chain, a pincers is provided which consists of an under arm 62 and an upper arm 63 pivotally mounted thereon on a pin 64, the upper arm being drawn against the under arm 62 by a spring 65 and both being provided with pointed ends. The movements of the pincers 62, 63 are so regulated that in order to remove the finished chain the arm 63 engages in the last link and the arm 62 in the last link but one of said chain (Fig. 9). The opening of the pincers is effected by means of a stop 81 mounted on the bearing of the pincers 12, which stop on being moved forward encounters a pin 80 which is fixed on the arm 63, and thereby lifts the latter. Instead of the pincers a simple pin or the like may also be employed.

For moving the pincers the arm 62 is mounted on a lever 66 which is mounted on a shaft 67 which may be displaced in bearings 33 and is under the action of a spring 54. It is thus pushed forward by means of a cam 53 mounted on the shaft 31, while it is drawn back by the spring 54. These pincers 62, 63 execute such a movement that on the engagement or hooking of the chain in the newly cut off coil $b$, the arm 62 stands exactly in the prolongation of the projecting end of this coil $b$. For this object the pincers 62, 63, in addition to their forward motion also have a rotary motion. This is effected by a disk 72 also mounted on the shaft 31, which disk by means of a pin 73 causes a lever 69 to turn which is pivotal on a pin 70 and under the action of a spring 71. This lever 69 again in turn acts on an arm 68 which is mounted on the shaft 67 and drawn upward by means of a spring 82. After the pincers 5 has again obtained a first coil $b$ which is engaged by the pincers 12, turned through 180° and delivered to the vertical pincers 29, the finished chain is hooked or hung with the last link but one in the end of the second coil, which has been brought forward in the meantime, and which projects from the pincers 5. For this object a slide 74 is provided which is under the action of a spring 75 and is carried or guided in a projection 76 of the pincers 5. This slide 74 is governed by a projection 79, which is preferably mounted on the cam disk 44. The projection 79 encounters a lever 77 which is pivotal on a pin 78 and thereby pushes forward the slide 74 against the action of its spring. Before it reaches the chain, in consequence of its sharp end, it penetrates between the arms 62 and 63 whereby these are opened and the chain released. In its further forward movement, it then pushes the chain over the coil $b$, so that now the chain link may be finished. The vertical pincers now again descends, in order to lay the link which has been turned through 180° on the one held in the pincers 5, in such a way that the pincers 12 can again grip both together with the chain hanging therefrom. This operation is now repeated and in this way the formation of a chain is effected, which has the appearance of a cord or rope and the links of which are soldered together at one place (Fig. 9).

I declare that what I claim is:—

1. In a machine for making soldered cord or twisted chain, means for coiling the wire from which the chain is to be formed; means for cutting separate convolutions from the coil in succession; and means for assembling two of such severed convolutions side by side preparatory to soldering said convolutions together to thereby form a link of the chain.

2. In a machine for making soldered cord or twisted chain, means for coiling the wire from which the chain is to be formed; means for cutting a convolution from the coil; means for grasping said convolution and for turning it through an angle of 180° so that the bottom portion thereof will be uppermost; means for cutting a second convolution from the coil; and means for bringing said two convolutions together side by side preparatory to soldering said two convolutions together to thereby form a link of the chain.

3. In a machine for making soldered cord or twisted chain, means for coiling the wire from which the chain is to be formed; means for cutting separate convolutions from the coil in succession; means for inserting a severed convolution through a link of the chain already formed; and means for placing a second convolution by the side of said first mentioned convolution preparatory to soldering said convolutions together to thereby form a link of the chain.

4. In a machine for making soldered cord or twisted chain, means for coiling the wire from which the chain is to be formed; means for cutting a convolution from the coil; means for grasping said convolution and for turning it through an angle of 180° so that the bottom portion thereof will be uppermost; means for inserting said convolution through a link of the chain already formed; means for cutting a second convolution from the coil; and means for bringing said two convolutions together side by side preparatory to soldering said two convolutions together to thereby form a link of the chain.

5. In a machine for making soldered cord or twisted chain, means for coiling the wire from which the chain is to be formed; means for cutting separate convolutions from the coil in succession; gripping mechanism for grasping said convolutions and for moving them away from the cutting mechanism and into the vicinity of chain link assembling mechanism; means for operating said gripping mechanism; a second gripping mechanism movable toward and from said first gripping mechanism and in a direction at right angles to the line of movement thereof, and capable of oscillation about a horizontal axis and of vertical movement; means for operating said second gripping mechanism; a third gripping mechanism capable of vertical movement and of oscillation about a vertical axis; means for operating said third gripping mechanism; and other gripping mechanism adapted to grasp and support the chain as it is formed.

6. In a machine for making soldered cord or twisted chain, means for coiling the wire from which the chain is to be formed; means for cutting separate convolutions from the coil in succession; and means for assembling two of such severed convolutions side by side preparatory to soldering them together to form a link of the chain, said means comprising a carriage capable of reciprocatory and of oscillatory movements, gripping mechanism carried by said carriage and capable of an oscillatory movement in a bearing carried thereby, and means for operating said carriage and said gripping mechanism.

7. In a machine for making soldered cord or twisted chain, means for coiling the wire from which the chain is to be formed; means for cutting separate convolutions from the coil in succession; and means for assembling two of such severed convolutions side by side pereparatory to soldering them together to form a link of the chain, said means comprising gripping mechanism capable of vertical movement and of oscillatory movement about a vertical axis, and means for operating said gripping mechanism.

8. In a machine for making soldered cord or twisted chain, means for coiling the wire from which the chain is to be formed; means for cutting separate convolutions from the coil in succession; and means for assembling such severed convolutions in groups of two each preparatory to soldering them together to form a link of the chain, said means comprising gripping mechanism adapted to grasp and support the finished chain; and means for operating said gripping mechanism.

In testimony whereof I affix my signature, in presence of two witnesses.

LUDWIG BRUCKMANN.

Witnesses:
  JEAN GULDEN,
  HERMANN HOPPEY.